Patented Sept. 19, 1922.

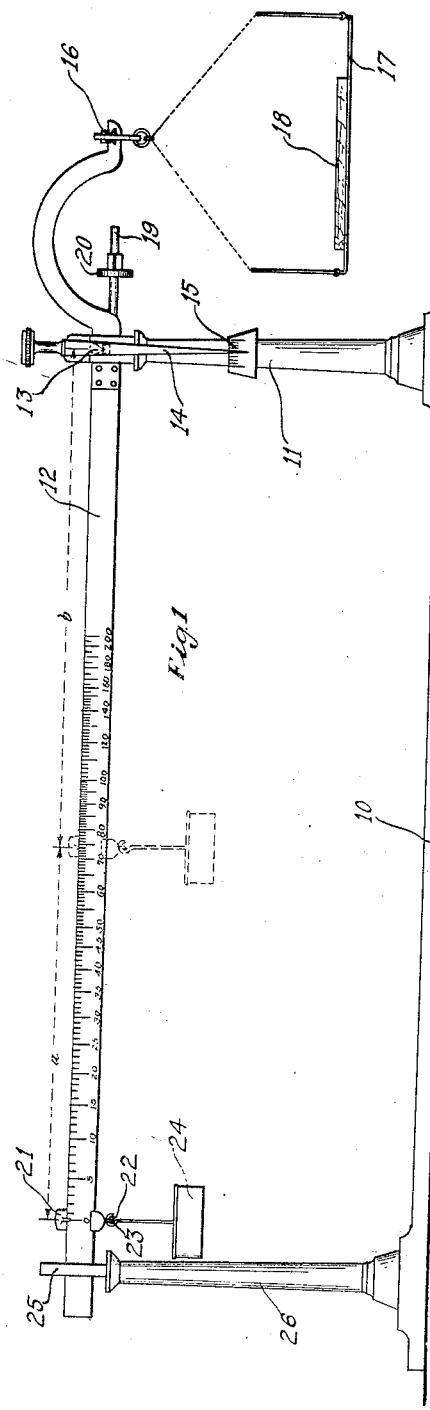

1,429,907

UNITED STATES PATENT OFFICE.

ARTHUR E. KRICK, OF INDIANAPOLIS, INDIANA, ASSIGNOR TO THE HUMIDITY CONTROL COMPANY, OF INDIANAPOLIS, INDIANA, A CORPORATION OF INDIANA.

CALCULATING BALANCE.

Application filed August 4, 1920. Serial No. 401,088.

*To all whom it may concern:*

Be it known that I, ARTHUR E. KRICK, a citizen of the United States, residing at Indianapolis, in the county of Marion and State of Indiana, have invented a new and useful Calculating Balance, of which the following is a specification.

It is the object of my invention to provide a balance which by two comparative weighings will give a direct percentage reading of the loss or gain in the weight of a body, or if desired of the final weight after such loss or gain, based either on the final or the initial weight or on the loss or gain in weight, as may be desired; all without requiring the actual weight at either the initial or the final stage to be determined.

This may be used, for instance, in dry-kiln determinations, for which it was originally designed, to determine the percentage of moisture in wood, by balancing a piece of green wood of unknown weight with the balance set at zero but without determining what the actual weight is, then drying out the wood to drive off the moisture, and then putting the dried wood on the balance and shifting the movable weight thereof until balance is again obtained, whereupon the reading will give the percentage of moisture driven off, based on either the final or "bone-dry" weight (which is the usual way of expressing it) or on the initial weight, as desired. The balance has many other uses, some of which will be referred to hereinafter.

The accompanying drawing illustrates my invention: Fig. 1 is a side elevation of a balance embodying my invention, showing only a single scale thereon, for use in determining the percentage loss of moisture in drying wood, based on the final or "bone-dry" weight; Figs. 2 and 3 are two views of a balance beam, taken from opposite sides respectively, having two scales on each side, those on one side showing the percentage loss or gain in weight as based on the "bone-dry" and the initial weight respectively, and those on the other side showing the percentage residue or final weight as based on the loss and on the initial weight respectively.

The balance comprises a base 10 having a supporting post 11 on which a balance beam 12 is supported on knife edges 13. A pointer 14 carried by the beam 12 indicates on a suitable scale 15 on the post 11 when the beam is in balance. The beam 12 on one side of its pivot point carries, on knife edges 16, a scale pan 17 in which a piece of wood 18 or other thing of which comparative weights are to be taken may be placed. The distance between the knife edges 13 and 16 is fixed; but conveniently this scale arm is bowed to provide space for a projecting adjusting screw 19 on which a nut 20 is adjustable toward and from the knife blades 13 to put the device in initial balance.

The beam 12 on the other side of the pivot point formed by the knife edges 13 has a graduated scale arm along which is slidable a slide 21 provided on its underside with an eye 22 for receiving the supporting hook 23 of a removable scale pan 24, in which may be placed shot, sand, or other similar material. A number of scale pans 24 may be provided, so that one can be removed with its contents between the first and second weighings of a determination, and one or more others used for weighings of other determinations, after which the first can be returned to its place for its second weighing. The beam 12 at its free end beyond its scale graduations may project through the usual guide eye 25 carried by a post 26, which guide eye prevents the end of the scale beam from being moved laterally and limits its vertical movement.

The graduations on the scale arm in Fig. 1 give directly the percentage of moisture which the piece of wood 18 loses between its first and second weighings, the percentage being based on the final or "bone-dry" weight. A piece of wood 18 is sawed off from a sample board to be dried. It may be of any convenient size, taken haphazard. It is placed in the scale pan 17, and the slide 21 is set at the zero point on the scale arm. This zero point is an outer point on the scale arm, at any desired distance from the knife edges 13; and in Fig. 1 is the outermost graduation along the scale arm. With the slide 21 set at this zero point, and the scale pan 24 hung therefrom, enough shot, sand or other material is placed in the pan 24 to balance the piece of wood 18. Then the piece of wood 18 is removed from the pan 17 and dried in any suitable way until all moisture is driven off. If it is desired to use the balance for other weighings in the meantime, the scale pan 24 with its contents undisturbed is removed, and other pans are used for the other weighings. When the piece of wood 18 has been dried it is again put on the scale pan 17, and the scale pan 24 which was used for the former weighing of that piece of wood is returned to its position on the slide 21 if it had been removed; but the contents of this scale pan 24 are carefully maintained the same as they were for the first weighing. Since the piece of wood 18 has lost weight by reason of the driving off of its moisture, to balance it the slide 21 with its scale pan 24 and the contents thereof is moved inward along the scale beam 12 until balance is again obtained. The reading on the scale arm 12 (in Fig. 1) gives the percentage of moisture given off, based on the final or "bone-dry" weight of the wood 18, but without determining what the actual weight of such wood was at any stage.

The graduations on the scale arm are carefully calculated to give this percentage indication. These graduations in Fig. 1, in order to indicate this percentage, are marked to indicate the relation, in percentage, between the lengths of the scale arm parts $a$ and $b$, which lie respectively between the zero point and the slide 21 and between the slide 21 and the knife blades 13. In other words, this reading at each graduation is the ratio $\frac{a}{b}$, expressed in percentage. Thus, if the wood loses as moisture half of its initial weight, so that the final weight is half the initial weight, and so that the loss in moisture is equal to (or 100% of) the final weight, the slide 21 is moved inward along the scale arm to a point half-way between the zero point and the knife edges 13 in order to obtain the second balance, and this half-way point is therefore marked "100," which is $\frac{a}{b}$ and indicates this percentage relation between the moisture loss and the final or "bone-dry" weight. If the moisture loss is one-third the initial weight, it is one-half the final or "bone-dry" weight, and the slide 21 must be moved in from the zero point one-third of the distance between the zero point and the knife blades 13 in order to produce balancing in the second weighing; and so this point one-third of the way in from the zero point is marked "50"—which again is $\frac{a}{b}$ for that point, or the percentage relation between that part of the scale arm length lying between such point and the zero point and the scale arm length lying between that same point and the knife blades 13.

The scale graduations in Fig. 1 are intended to indicate only the percentage loss of weight on the basis of the final or "bone-dry" weight. This is the percentage which dry-kiln operators usually wish to know, so that for much dry-kiln work a balance with the single set of graduations shown in Fig. 1 is all that is needed. Other percentage relations, however, are also often desirable, such as the gain in weight as well as the loss in weight, and such as either loss or gain in weight on the basis of the initial rather than of the final weight, and such as the final weight (ash in coal determinations) after some weight-changing action, whether loss or gain, with relation to the change in weight, or with relation to the initial weight. These may be determined by comparative weighings as above described, with the performance of the weight-changing operation between the two weighings, the scale graduations being arrranged to give this percentage reading.

The scale beam shown in Figs. 2 and 3, with two scales on each side, will give all of these percentage readings. The two scales shown in Fig. 2 give the percentage loss or gain in weight; the upper scale on the basis of the final weight, and the lower scale on the basis of the initial weight, both scales indicating percentage losses for positions of the slide between the zero point and the knife edges 13, and both indicating percentage gains for positions out beyond the zero point. The upper scale in Fig. 2 differs from the scale in Fig. 1 only by the addition of these graduations out beyond the zero point. The two scales shown in Fig. 3 give the percentage final weight; the upper scale on the basis of the loss or gain in weight, and the lower scale on the basis of the initial weight, both scales giving readings between the knife edges 13 and the reference point (which corresponds to the zero point in the scales in Fig. 2) when losses have occurred, and both giving readings outward beyond such reference point when gains have occurred. Both the upper scales and the lower scales on the two sides of the beam are the same between the knife edges and the reference point (the zero point in Fig. 2), but reversed in position, the zero point in Fig. 3 being at the knife edges. The upper scales are scales wherein equal length divisions have non-uniform values, ranging from zero to infinity; whereas in the lower scales equal length divisions have uniform values, ranging from zero to 100. The reference point for the upper scale in Fig. 3 has the value of an infinity and that for the lower scale a value of 100%.

For simplicity in illustration, only a few markings on each scale are given. These are the markings for the quarter points between the reference point and the knife edges 13, and for corresponding points out beyond the reference point.

For operating any of these scales, the thing of which comparative weights are desired is placed in the initial condition on the scale pan 17, and is balanced by shot in the pan 24 with the slide at the reference point. Then the weight-changing operation is performed, and thereafter the thing is returned to the scale pan 17, and the slide 21 slid in or out until balance is again obtained. As in the case of Fig. 1, the distance $a$ is the distance from the final setting of the slide to the reference point (the zero point in Fig. 2), and the distance $b$ is the distance from such final setting to the knife edges 15. This applies whether the slide 21 is moved inward or outward from the reference point; Figs. 2 and 3 show the slide moved outward to the same point. The reading on the upper scale in Fig. 2 gives the ratio $\frac{a}{b}$, in percentage, and indicates the loss or gain (the gain with the setting shown) on the basis of the final weight. This is useful in determining drying and absorption values. The lower scale in Fig. 2 gives the ratio $\frac{a}{\text{initial length}}$, and indicates the loss or gain (the gain with the setting shown) on the basis of the initial weight; by "initial length" is meant the distance from the reference point to the knife blades 13. The upper scale in Fig. 3 gives the ratio $\frac{b}{a}$, in percentage, and indicates the final or residue weight on the basis of the loss or gain in weight. This gives a direct reading of the percentage between the ash and the volatile matter in coal determinations, for instance. The lower scale in Fig. 3 gives the ratio $\frac{b}{\text{initial length}}$, in percentage, and indicates the final or residue weight on the basis of the initial weight; a direct reading on this scale gives the percentage of ash in the original coal, in coal determinations.

Other uses besides those mentioned by way of example may be made of my balance. Ordinarily not all four scales will be needed, and any one or more of them may be used alone if desired, as illustrated in one instance in Fig. 1.

I claim as my invention:

1. A calculating balance, comprising a pivoted beam, a scale pan mounted on one arm thereof, a weight folder arranged to hold a weight variable in value, said weight holder and its carried weight being slidable inward and outward along the other arm of said beam independent of any weight-shifting along the first arm, said last-named arm being provided with a scale each graduation of which indicates directly the ratio between two scale arm lengths of which at least one is the distance from such graduation to a fixed point on the scale arm.

2. A calculating balance, comprising a pivoted beam, a scale pan mounted on one arm thereof, a weight variable in value and slidable inward and outward along the other arm of said beam, said last-named arm being provided with a scale each graduation of which indicates directly the ratio between the distances of such graduation from two separated points on said scale arm, one of such points being the pivot point of the beam.

3. A calculating balance, comprising a pivoted beam, a scale pan mounted on one arm thereof, a weight variable in value and slidable inward and outward along the other arm of said beam, said last-named arm being provided with a scale each graduation of which indicates directly the ratio between the distance of such graduation from a reference point on the scale arm removed from the pivot point of the beam and the distance of such graduation from such pivot point.

4. A calculating balance, comprising a pivoted beam, a scale pan mounted on one arm thereof, a weight variable in value and slidable inward and outward along the other arm of said beam, said last-named arm being provided with a scale each graduation of which indicates directly the ratio between the distance of such graduation from a reference point on the scale arm removed from the pivot point of the beam and another distance on such scale arm.

5. A calculating balance, comprising a pivoted beam, a scale pan mounted on one arm thereof, a weight variable in value and slidable inward and outward along the other arm of said beam, said last-named arm being provided with a scale each graduation of which indicates directly the ratio between two scale arm lengths of which at least one is the distance from such graduation to a fixed point on the scale arm removed from the pivot point of the beam.

In witness whereof, I have hereunto set my hand at Indianapolis, Indiana, this 2nd day of August, A. D. one thousand nine hundred and twenty.

ARTHUR E. KRICK.